(12) United States Patent
Davidich

(10) Patent No.: US 10,919,552 B2
(45) Date of Patent: Feb. 16, 2021

(54) METHOD FOR DETERMINING AN EMBARKING/DISEMBARKING DURATION OF AN OBJECT

(71) Applicant: SIEMENS MOBILITY GMBH, Munich (DE)

(72) Inventor: Maria Davidich, Munich (DE)

(73) Assignee: Siemens Mobility GmbH, Munich (DE)

( * ) Notice: Subject to any disclaimer, the term of this patent is extended or adjusted under 35 U.S.C. 154(b) by 7 days.

(21) Appl. No.: 16/132,668

(22) Filed: Sep. 17, 2018

(65) Prior Publication Data
US 2019/0084600 A1 Mar. 21, 2019

(30) Foreign Application Priority Data

Sep. 15, 2017 (EP) ..................................... 17191249

(51) Int. Cl.
*B61L 27/00* (2006.01)
*G06N 3/00* (2006.01)
(Continued)

(52) U.S. Cl.
CPC ....... *B61L 27/0077* (2013.01); *B61L 27/0022* (2013.01); *B61L 27/04* (2013.01);
(Continued)

(58) Field of Classification Search
USPC .......................................................... 701/19
See application file for complete search history.

(56) References Cited

U.S. PATENT DOCUMENTS

| 5,343,513 A | * | 8/1994 | Kay | ...................... H04W 24/00 |
| | | | | 370/347 |
| 5,797,330 A | * | 8/1998 | Li | .......................... B61B 13/06 |
| | | | | 104/119 |

(Continued)

FOREIGN PATENT DOCUMENTS

| CN | 106529001 A | 3/2017 |
| EP | 2388737 A1 | 11/2011 |

(Continued)

OTHER PUBLICATIONS

Wei Li, A dynamic simulation model of passenger flow distribution on schedule-based rail transit networks with train delays, Journal of Traffic and Transportation Engineering, 2016; 3(4), p. 364-373 (Jul. 28, 2016)(hereinafter "Wei").*

(Continued)

*Primary Examiner* — Jean Paul Cass
(74) *Attorney, Agent, or Firm* — Laurence Greenberg; Werner Stemer; Ralph Locher

(57) ABSTRACT

A method determines a duration of an embarking process and/or a disembarking process of at least one autonomously movable object conveyable by a movable unit. The method includes determining the duration of the embarking process and/or the disembarking process of at least one autonomously movable object embarking and/or disembarking the movable unit by using a model describing the embarking process and/or the disembarking process of at least one autonomously movable object embarking and/or disembarking the movable unit spatially discreetly dynamically. The determination method provides a flexible, reliable, time and cost saving operation of a travelling network.

15 Claims, 3 Drawing Sheets

(51) Int. Cl.
*G06N 20/00* (2019.01)
*B61L 27/04* (2006.01)
*G06Q 50/30* (2012.01)

(52) U.S. Cl.
CPC .............. *G06N 3/006* (2013.01); *G06N 20/00* (2019.01); *G06Q 50/30* (2013.01)

(56) References Cited

U.S. PATENT DOCUMENTS

| | | | | |
|---|---|---|---|---|
| 6,195,023 | B1* | 2/2001 | Walsh | B61L 25/021 246/122 R |
| 6,246,950 | B1* | 6/2001 | Bessler | F01P 11/16 318/473 |
| 6,281,606 | B1* | 8/2001 | Westlake | A63H 19/24 307/125 |
| 6,347,265 | B1* | 2/2002 | Bidaud | B61K 9/08 701/19 |
| 6,353,780 | B1* | 3/2002 | Hart | B60T 7/126 701/20 |
| 6,456,937 | B1* | 9/2002 | Doner | B61L 15/0027 246/122 R |
| 6,853,890 | B1* | 2/2005 | Horst | B61C 17/12 246/187 A |
| 6,985,803 | B2* | 1/2006 | Abdel-Malek | B61K 9/00 246/122 R |
| 7,072,747 | B2* | 7/2006 | Armbruster | B61L 3/006 701/19 |
| 7,769,544 | B2* | 8/2010 | Blesener | B61L 29/28 701/301 |
| 2010/0063657 | A1* | 3/2010 | Kumar | B61L 25/025 701/19 |
| 2011/0184596 | A1* | 7/2011 | Andreasson | B61L 23/34 701/19 |
| 2011/0231354 | A1* | 9/2011 | O'Sullivan | G08G 1/0104 706/46 |
| 2012/0085871 | A1* | 4/2012 | Chun | B61B 1/00 246/2 S |
| 2012/0221181 | A1* | 8/2012 | Rosener | A63H 19/24 701/20 |
| 2012/0245769 | A1* | 9/2012 | Creissels | B61B 12/022 701/19 |
| 2012/0253565 | A1* | 10/2012 | Kumar | B61F 3/06 701/19 |
| 2013/0261856 | A1* | 10/2013 | Sharma | B61L 25/025 701/19 |
| 2014/0012438 | A1* | 1/2014 | Shoppa | B61L 1/188 701/19 |
| 2014/0081486 | A1* | 3/2014 | Palanti | B61L 25/023 701/19 |
| 2015/0057853 | A1* | 2/2015 | Fisher | B61C 17/12 701/20 |
| 2015/0094885 | A1* | 4/2015 | Dargy | B61L 23/048 701/19 |
| 2015/0134156 | A1* | 5/2015 | Henry | G07C 5/00 701/19 |
| 2015/0158510 | A1* | 6/2015 | Fries | B61L 1/20 701/19 |
| 2015/0217790 | A1* | 8/2015 | Golden | B61C 17/12 701/19 |
| 2015/0261221 | A1* | 9/2015 | Doyle | B60W 30/1886 701/3 |
| 2015/0294298 | A1* | 10/2015 | Michishita | G07B 15/02 705/13 |
| 2016/0194017 | A1* | 7/2016 | Schmale | B61L 15/0081 701/19 |

FOREIGN PATENT DOCUMENTS

| | | |
|---|---|---|
| EP | 2469455 A1 | 6/2012 |
| EP | 2592586 A1 | 5/2013 |

OTHER PUBLICATIONS

Igarashi, T. et al., Digital automatic train control system for the Shinkansen lines of East Japan Railway Company, (https://www.witpress.com/Secure/elibrary/papers/CR02/CR02009FU.pdf) © 2002 WIT Press, Ashurst Lodge, Southampton, SO40 7AA, UK (2002)(hereinafter "Igarashi").*

Zhang et al: "Modeling and simulation of passenger alighting and boarding movement in Beijing metro stations", Science Direct, Transportation Research Part C, vol. 16, (2008) pp. 635-649, XP022797504, [retrieved on Feb. 5, 2008].

Blue et al.: "Cellular automata microsimulation for modeling bi-directional pedestrian walkways", Pergamon Transportation Research Part B 35 (2001) pp. 293-312.

Johansson et al.: "Specification of a Microscopic Pedestrian Model by Evolutionary Adjustment to Video Tracking Data", Advances in Complex Systems, World Scientific Publishing Company, Oct. 25, 2008.

Davidich et al.: "Predicting Pedestrian Flow: A Methodology and a Proof of Concept Based on Real-Life Data" PLOS ONE, Dec. 2013, vol. 8, Issue 12, e83355.

Hartmann D: "Adaptive pedestrian dynamics based on geodesics", New Journal Physics 12 (2010) 043032.

Davidich et al.: "Waiting zones for realistic modelling of pedestrian dynamics: A case study using two major German railway stations as examples", Transportation Research Part C, vol. 37, (2013), pp. 210-222.

* cited by examiner

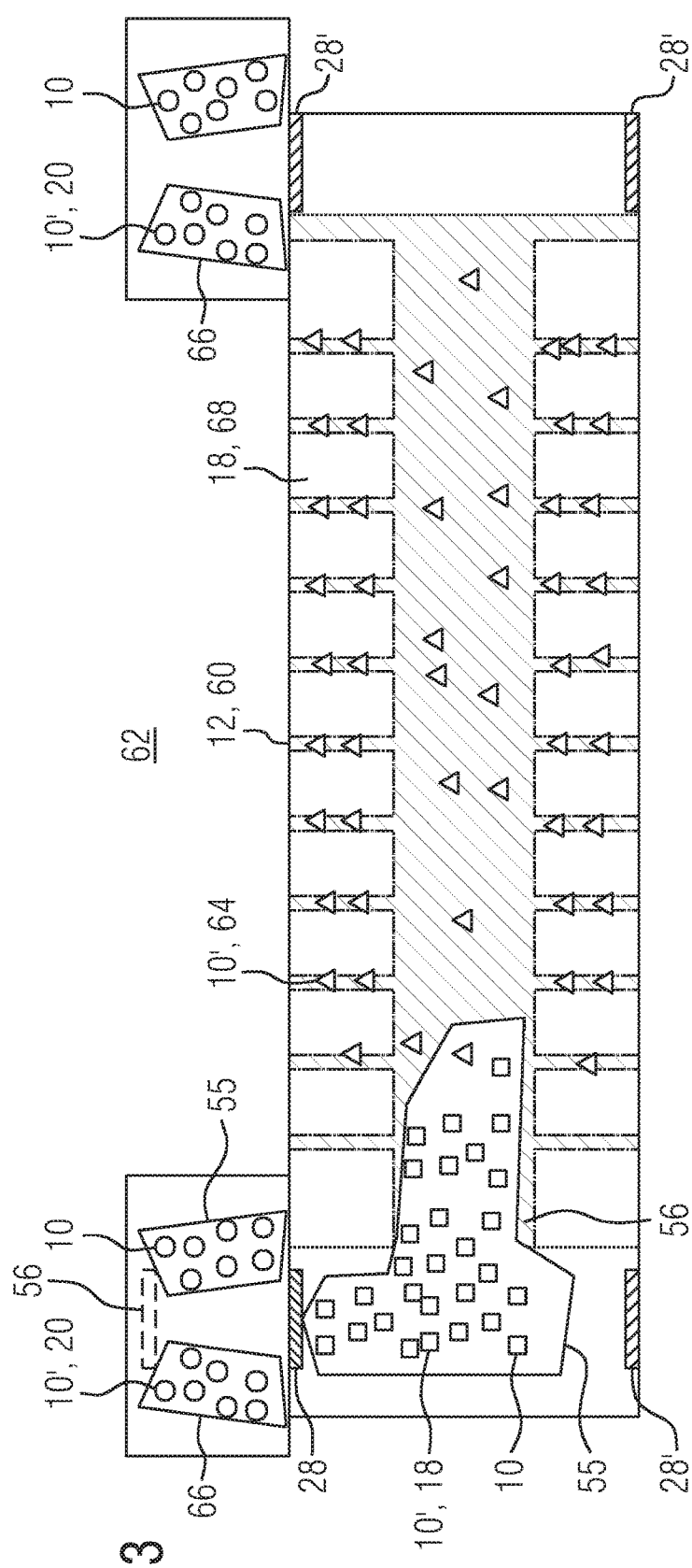
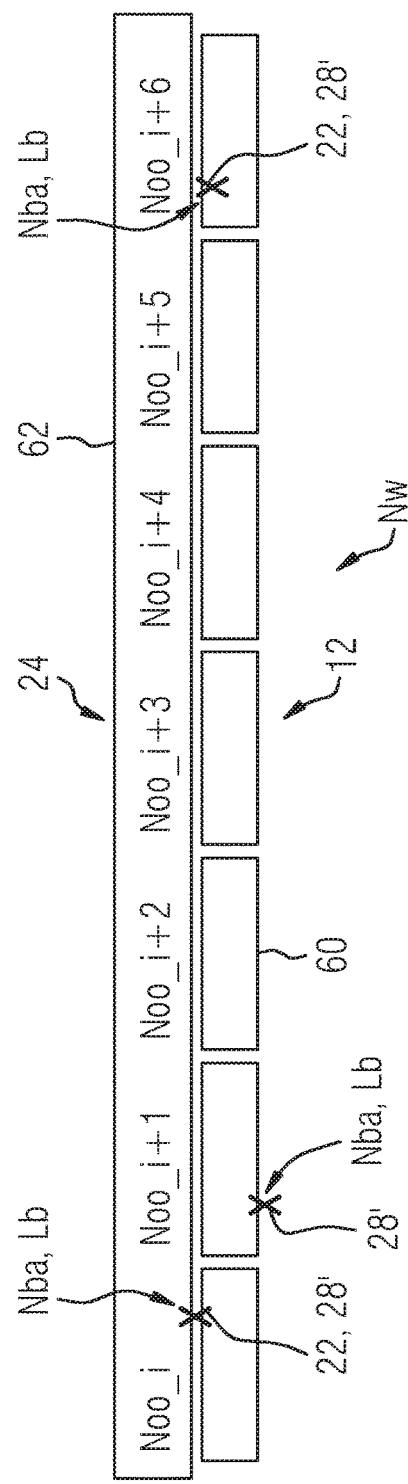
FIG 3
FIG 4

METHOD FOR DETERMINING AN EMBARKING/DISEMBARKING DURATION OF AN OBJECT

CROSS-REFERENCE TO RELATED APPLICATION

This application claims the priority, under 35 U.S.C. § 119, of European application EP 17191249.6, filed Sep. 15, 2017; the prior application is herewith incorporated by reference in its entirety.

BACKGROUND OF THE INVENTION

Field of the Invention

The present invention relates to a method for determining a duration of an embarking process and/or a disembarking process of at least one autonomously movable object conveyable by a movable unit. The present invention further relates to a use of such a determination method as a well as to a method for training a model used in the determination method.

Modern railway systems as well as modern trains being operated in such railway systems are subjected to challenging demands like operating with predictable schedules and high accuracy as well as travelling securely and reliably. Hence, unforeseen occurrences like reduces or blocked functionality of components of the train or of the track network or hindrances at a track or stations of the train may disturb proper operation of a selected train or the whole track network. For example, doors are typically one of the "weakest" components in a train, i.e. very often doors get broken, and if a door is blocked, passengers cannot use it for embarking and disembarking a train. As a result train stop time at a station may increase since passengers will need more time for embarking and disembarking due to reduced number of working doors, which in return may result in delay of a train. This issue becomes critical especially for tube and local trains in rush hours, since these trains usually have many stops and the number of passengers is high. In many cases operators of trains have to pay high penalties for every minute of train delay, if it happens due to a technical problem.

It is, for example, known to monitor in real time the embarking process and/or the disembarking process with sensors installed at a door. Thus, the sensors detect whether there are still passengers embarking or disembarking the train at a selected door. Due to the sensor output a current situation at a door is monitored. Currently, no preventive estimations of increased time due to occurrences, like broken doors, are performed.

It is a first objective of the present invention to provide a method for determining a duration of an embarking process and/or a disembarking process of at least one autonomously movable object conveyable by a movable unit with which the above-mentioned shortcomings can be mitigated, and especially, to provide a method that optimizes an operation of a travelling network resulting in a more flexible, reliable, time and cost saving network as it is known from the prior art.

Further, it is a second object of the invention to provide an advantageous use of the method for determining a duration of an embarking process and/or a disembarking process.

Furthermore, it is a third objective of the present invention to provide a method for training a model used during the determination method that allows a quick and reliable execution of the determination method.

SUMMARY OF THE INVENTION

Accordingly, the present invention provides a method for determining a duration of an embarking process and/or a disembarking process of at least one autonomously movable object conveyable by a movable unit.

It is proposed that the method contains the step of: determining the duration of the embarking process and/or the disembarking process of at least one autonomously movable object embarking and/or disembarking the movable unit by using a model describing an embarking process and/or the disembarking process of at least one autonomously movable object embarking and/or disembarking a movable unit spatially discreetly dynamically.

Due to the inventive method operations of the mobile unit, like a train, can advantageously be managed effectively. Delays of a train can be estimated easily. Moreover, due to the possibility of calculating operating times and schedules accurately trains may be deployed without compromising the operation of a network even if a component, like a door, is not functioning properly or is broken. Furthermore, a delay can be calculated fast providing an advantageous online usage. Additionally, costs and time can be saved as well as penalties due to delays can be prevented.

Even if a chosen term is used in the singular or in a specific numeral form in the claims and the specification the scope of the patent (application) should not be restricted to the singular or the specific numeral form. It should also lie in the scope of the invention to have more than one or a plurality of the specific structure(s).

An "autonomously movable object" is intended to mean an object that is able to move on its own or in other words, an object that takes an active participation during embarking or disembarking the mobile unit. The autonomously movable object may be referred to as "object" in the following text. Hence, the autonomic movable object may be an object selected out of the group consisting of a human, an animal, a robot and a vehicle. The phrase "conveyable by a mobile unit" should be understood as the possibility of a movement of the object by the mobile unit either in the future (after the embarking) and/or in the past (before the disembarking). Hence, the phrasing "being conveyable by a movable unit and/or was conveyable by the movable unit" may be also used.

The mobile unit might be any unit, especially constructed unit, like a motor vehicle (car, motor cycle, bicycle, van, lorry, bus, train) that can be moved, especially by human manipulation. Preferably, it may be a track-bound vehicle. A track-bound vehicle is intended to mean any vehicle feasible for a person skilled in the art, which is, due to a physical interaction with a track, especially a pre-determined track, restricted to this track or path. A physical interaction/connection should be understood as a form fit connection, an electrical connection or a magnetic connection. The physical connection might be releasable. In this context a "pre-determined track" is intended to mean a beforehand existing, human-built track or path containing selected means building or forming the track, like a rail or a cable. The pre-determined track may be also referred to as track in the following text. Preferably, the pre-determined track is a subway track or a railway track, like the UK, German or Russian mainline railway.

The vehicle may be a train, an underground railway, a tram or a trolley bus. Preferably, the track-bound vehicle may be a train. Hence, the method can be employed where several vehicles are traveling the same track. Advantageously, the track-bound vehicle or the train may be a high speed train. Thus, the method can be used for a network in which a high level of security is essential and needed. The track-bound vehicle may be also referred to as vehicle or train in the following text.

In this context an embarking process and/or a disembarking process is intended to mean all the actions done by one specifically selected autonomously movable object concerning an entering and/or exiting of a mobile unit effected by the mobile unit itself and by concomitants surrounding or going along with the entering and/or exiting the mobile unit. Thus, it concerns the actual action to enter/exit the mobile unit as well as all pre- and post-actions concerning this entering/exiting action, like moving of the selected object to or from the mobile unit from a (secure) starting point to a (secure) terminal point or waiting of the selected object for an obstacle (e.g. other present object) to enter or exit the mobile unit. The "embarking process" and the "disembarking process" may be referred to as "embarking" and "disembarking" in the following text. Moreover, a "duration" is intended to mean the time needed to do/perform/finish the embarking and/or a disembarking process.

The duration is determined for at least one station or stop of the mobile unit, but may be done for several stations individually or for an accumulation of several stations. Moreover, the determination according to the invention is done for one specifically selected autonomously movable object. However, it may be performed individually for several objects and the determination may account for the duration/time needed by all objects together. Furthermore, the determination may be performed for one position/location of the mobile unit or for several locations. For example, the duration may be determined for one door or for several doors of the mobile unit. However, since the embarking and/or disembarking process at each door is normally performed simultaneously the total duration is defined by the duration referring to the door at which the embarking/disembarking takes the longest (no accumulation of the durations).

The model may be any model feasible for a person skilled in the art that describes the embarking/disembarking spatially discreetly dynamically. However, most suitably the embarking and/or disembarking model may be a model selected out of the group consisting of: a cellular automaton model and a social force model. Hence, motion dynamics can be determined and evaluated efficiently and reliably. For example, for a cellular automaton model please refer to: "Blue V J, Adler J L (2001) Cellular Automata Microsimulation for Modeling Bidirectional Pedestrian Walkways. Transp Res Part B Methodol 35: 293-312." and for a social force model please refer to "Johansson A, Helbing D, Shukla P K (2007) Specification of the Social Force Pedestrian Model by Evolutionary Adjustment to Video Tracking Data. Adv Complex Syst 10: 271-288."

In a further embodiment of the invention, the cellular automaton model uses a grid with at least one cell, wherein a dimension of the at least one cell is dependent from an average value referring to a category of the at least one autonomously movable object. Thus, the determination can be adjusted to individual needs as well as different set-ups. In this context "category of the . . . object" is intended to mean a characteristic of the object, like dimension, size, length, shape etc. Moreover, an "average value" refers to the average resulting from the examination of the specific characteristic of a plurality of comparable objects, like all males of a selected group, all electrified wheel chairs etc. Further, an area of observation may be divided into a lattice of cells.

Furthermore, it is advantageous when the cellular automaton model uses a hexagonal grid due to its two additional natural directions of movement. This is advantageous especially in comparison to a square grid. A cell diameter may be selected due to a needed size depending on the space requirements of the object. A diameter should be defined as a diameter of an outer circle around the hexagon. The diameter may be between 200 centimeters (cm) and 25 cm, preferably between 75 cm and 35 cm and most preferably between 60 cm and 40 cm. Hence, the dimensions are suitable for the size of electrified wheelchairs to the size of a dog. Preferably, the cell diameter is set to 53 cm to accommodate an average sized Caucasian male. This parameter can be adapted to better fit e.g. Asian pedestrians or children.

Preferably, the cellular automaton model may use a two dimensional plane and thus being adapted to objects, like pedestrians, which move on a single plane, i.e. two dimensions only. Consequently, spatial dimensions and the topology can be selected to fit crucial properties of the object or whole system.

To obtain correct predictions the model processes at least one input. The input may be any input feasible for a person skilled in the art that describes or characterises the embarking process and/or the disembarking process or any element/time/condition concerning these processes. The input is a variable selected out of the group consisting of: embarking and/or disembarking data, configuration data, time data and operational data. The model may work with several variables at the same time as well as with different or several values of the same kind of variable.

The embarking and/or disembarking data mainly concern embarking and/or disembarking process and may be an input variable selected out of the group consisting of: a number, kind or dimension of an object inside the mobile unit, a number, kind or dimension of an object outside the mobile unit, a number of an obstacle inside the mobile unit, a number of an obstacle outside the mobile unit, a number of an obstacle at the mobile unit, a position of the object.

In this context the object should be understood as the active part during the embarking/disembarking process and an obstacle as an inactive part. Hence, the obstacle may be another autonomously movable object or a passive obstacle, like a (temporarily) stationary element/item (e.g. a wall, hand rail, step, railway seat, luggage, trolley, perambulator, rubbish bin, maintenance area, non-functioning, blocked, broken door etc.) that may influence or hinder or block the active object during the embarking/disembarking.

Moreover, the configuration data mainly concern (a) characteristic(s), like (a) spatial or dimensional characteristic(s), of (an) element(s) or component(s) being involved in the embarking and/or disembarking process and may be an input variable selected out of the group consisting of: a location, dimension or kind of an obstacle—inside and outside of the mobile unit, a characteristic of the movable unit, like a number of wagons, a characteristic of a station of the movable unit, like in which direction the train is entering the station and thus at which side of the train the doors will open.

Preferably and advantageously, an exact topology of the object, the obstacle(s) and/or the mobile unit or (a) part(s) thereof and/or of (an) element(s) or component(s) being involved in the embarking and/or disembarking process may be taken into account by the model. Hence, the embarking/disembarking can be simulated realistically and precisely.

Furthermore, the time data mainly concern timely features and may be an input variable selected out of the group consisting of: a scheduled arrival time of the mobile unit at a station, a scheduled departure time of the mobile unit at a station, an actual arrival time of the mobile unit at a station, an actual departure time of the mobile unit at a station, a preferred duration of the embarking process or the disembarking process.

Further, the operational data mainly concern operational characteristics of the elements or components being involved in the embarking and/or disembarking process and may be an input variable selected out of the group consisting of: a free-flow velocity of the object, a velocity of the movable unit, an opening velocity of a door of the movable unit.

On kind of input variable may belong to several categories, however, they are sorted above in respect to their main function.

A movement of the object is dependent from its surroundings, like available space for movement and a presence of other objects and obstacles. These factors determine the free-flow velocity of the object. Beneficially, the free-flow velocity of the object is between 1 m/s and 1.5 m/s, preferably between 1.2 m/s and 1.4 m/s and most preferably of 1.34 m/s. It has been shown that these values represent velocities found in the context of pedestrians moving e.g. in a station or on a platform.

As explained above, the embarking and/or disembarking of the autonomously movable object may be affected by several factors, like obstacles surrounding the object or located along a path taken during the embarking and/or disembarking. Such an obstacle may be located/positioned outside, inside or at the mobile unit and my be any element or structure feasible for a person skilled in the art, like a wall, a hand rail, a step, a railway seat, luggage, a suitcase, a trolley, a perambulator, a rubbish bin, a maintenance area, a non-functioning, blocked, broken door. According to a preferred refinement, the obstacle may be another autonomously movable object, a stationary element and especially, the obstacle at the mobile unit is a broken door. Thus, hindrances or malfunctions can be considered during the determination of the duration for embarking and/or disembarking.

In this context a "broken door" should be understood as a door intended for entering and exiting the mobile unit that is unable to work properly or cannot be used for any reason. For example, it is broken or blocked. E.g. the door may be blocked by something inside or outside of the mobile unit so that it is prohibited to use that door.

The invention further refers to a use of the beforehand described determination method for determining a delay of the mobile unit at a station of the mobile unit, wherein the embarking process and/or the disembarking process occurs at the station.

It is proposed that the delay is determined by the below described steps.

a) Comparing a determined duration for the embarking process and/or the disembarking process with a pre-set duration for an embarking process and/or a disembarking process.
b) If the determined duration for an embarking process and/or a disembarking process is longer than the pre-set duration for an embarking process and/or a disembarking process, then the difference between the determined duration for an embarking process and/or a disembarking process and the pre-set duration for an embarking process and/or a disembarking process is the delay of the mobile unit at the station.

Due to the inventive matter delays of a train at a selected station can be estimated easily. Moreover, coasts and time can be saved as well as penalties due to delays can be prevented.

In this context a "pre-set duration for an embarking process and/or a disembarking process" is intended to mean a beforehand defined or known duration. This duration may be known due to historic experiences or set due to needed requirements.

The inventive use may be employed for determining a total delay of the mobile unit over a travelling distance of the mobile unit, wherein the travelling distance leads over several stations to a final station of the mobile unit and wherein the determination of the total delay of the mobile unit along the travelling distance at the final station is based on an accumulation of the delays at the respective several stations and at the final station. Advantageously, operations of the mobile unit can be managed effectively.

To adapt the calculation of the total delay with an existing or pre-defined schedule, the accumulation may consider at least one boundary condition. This boundary condition may be any condition feasible for a person skilled in the art and may be, for example, a pre-set departure time at a selected station or a time frame referring to an occupied section of the track (delay gets mobile unit into conflict with other mobile unit(s) travelling the track of the mobile unit).

The inventive use may be further employed for an online prognosis of the delay and/or the total delay, wherein the determination of the delay and/or the total delay is based on real time data as an input for the spatial discreet dynamical model. Since the determination works fast, the delay can be provided quickly. This enables a network operator to react fast, for example, by activating counter measures.

The inventive use may be further employed for an offline simulation of the delay and/or the total delay, wherein the determination of the delay and/or the total delay is based on historic data as input for the spatial discreet dynamical model. Due to this, operating times and schedules can be calculated accurately. Hence, trains may be deployed without compromising the operation of a network even if a component, like a door, is not functioning properly or is broken.

The invention further refers to a method for training a spatial discreet dynamical model, especially the spatial discreet dynamical model according to the above described method.

It is proposed that the method for training contains at least the following steps:

a) providing of a training data set that contains a plurality of training data, wherein the training data contains a duration of an embarking process and/or a disembarking process of at least one autonomously movable object embarking and/or disembarking the movable unit;
b) selecting the training data from the group consisting of: embarking and/or disembarking data, and/or
configuration data, and/or
time data, and/or
operational data; and/or
c) training the model by using the training data set, wherein at least one parameter of the model is adapted.

Due to the inventive method the training can be performed effectively and quickly. Moreover, this method provides a much higher reliability of determination in comparison with state of the art methods.

Preferably, the embarking and/or disembarking data and/or the configuration data and/or the time data and/or the operational data is at least one variable as listed above.

The invention further relates to a determination system for determining a duration of an embarking process and/or a disembarking process of at least one autonomously movable object conveyable by a movable unit. It is proposed that the determination system contains a determining device adapted to perform the determining step of the inventive method.

The determining system may contain a computer and may be located at and/or controlled from a control center of the network. Moreover, used input or needed data, like the pre-set duration, variables, historic data, a boundary condition, may be stored in a data base of the determining system or its computer.

Due to these inventive matters the determination can be performed automatically and thus saving costs, time and man power.

The invention and/or the described embodiments thereof may be realised—at least partially or completely—in software and/or in hardware, the latter e.g. by means of a special electrical circuit.

Further, the invention and/or the described embodiments thereof may be realised—at least partially or completely—by means of a computer readable medium having a computer program, which computer program, when executed on a computer, realizes the method according to the invention and/or according to the embodiments thereof.

Thus, it is proposed to use a method that allows automatic estimation of train delay due to, for example, broken door(s).

In summary, advantages of the invention are:
a) The operators of trains can more effectively manage train operation, i.e. if they have a train with (a) broken door(s) they can calculate on which track and at what time of the day the broken (a) broken door(s) will lead to train delay and when not (and how long this delay could be), which may support their decision making where which train should run to minimize delays and therefore penalties.
b) The method can be used online and offline. Offline for estimation of possible delays in case to use of a train with broken (a) broken door(s) is wanted. And online for estimation of current delay of a train (prediction of train delay) based on a current situation. This will allow gaining time for reaction if necessary.
c) It allows automatic calculation of train delay.
d) The method is fast, even for a complex scenario when the train is packed that simulation time is less than a second on a common PC.
e) It saves time and costs.

The previously given description of advantageous embodiments of the invention contains numerous features which are partially combined with one another in the dependent claims. Expediently, these features can also be considered individually and be combined with one another into further suitable combinations. Furthermore, features of the method, formulated as apparatus features, may be considered as features of the assembly and, accordingly, features of the assembly, formulated as process features, may be considered as features of the method.

The above-described characteristics, features and advantages of the invention and the manner in which they are achieved can be understood more clearly in connection with the following description of exemplary embodiments which will be explained with reference to the drawings. The exemplary embodiments are intended to illustrate the invention, but are not supposed to restrict the scope of the invention to combinations of features given therein, neither with regard to functional features. Furthermore, suitable features of each of the exemplary embodiments can also be explicitly considered in isolation, be removed from one of the exemplary embodiments, be introduced into another of the exemplary embodiments and/or be combined with any of the appended claims.

Other features which are considered as characteristic for the invention are set forth in the appended claims.

Although the invention is illustrated and described herein as embodied in a method for determining of an embarking/disembarking duration of an object, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is an illustration showing the mobile unit from FIG. 1 at one station in a setting up scenario of an embarking/disembarking train simulation; and FIG. 4 is a schematic representation of the scenario from FIG. 3.

DETAILED DESCRIPTION OF THE INVENTION

Figure 1:
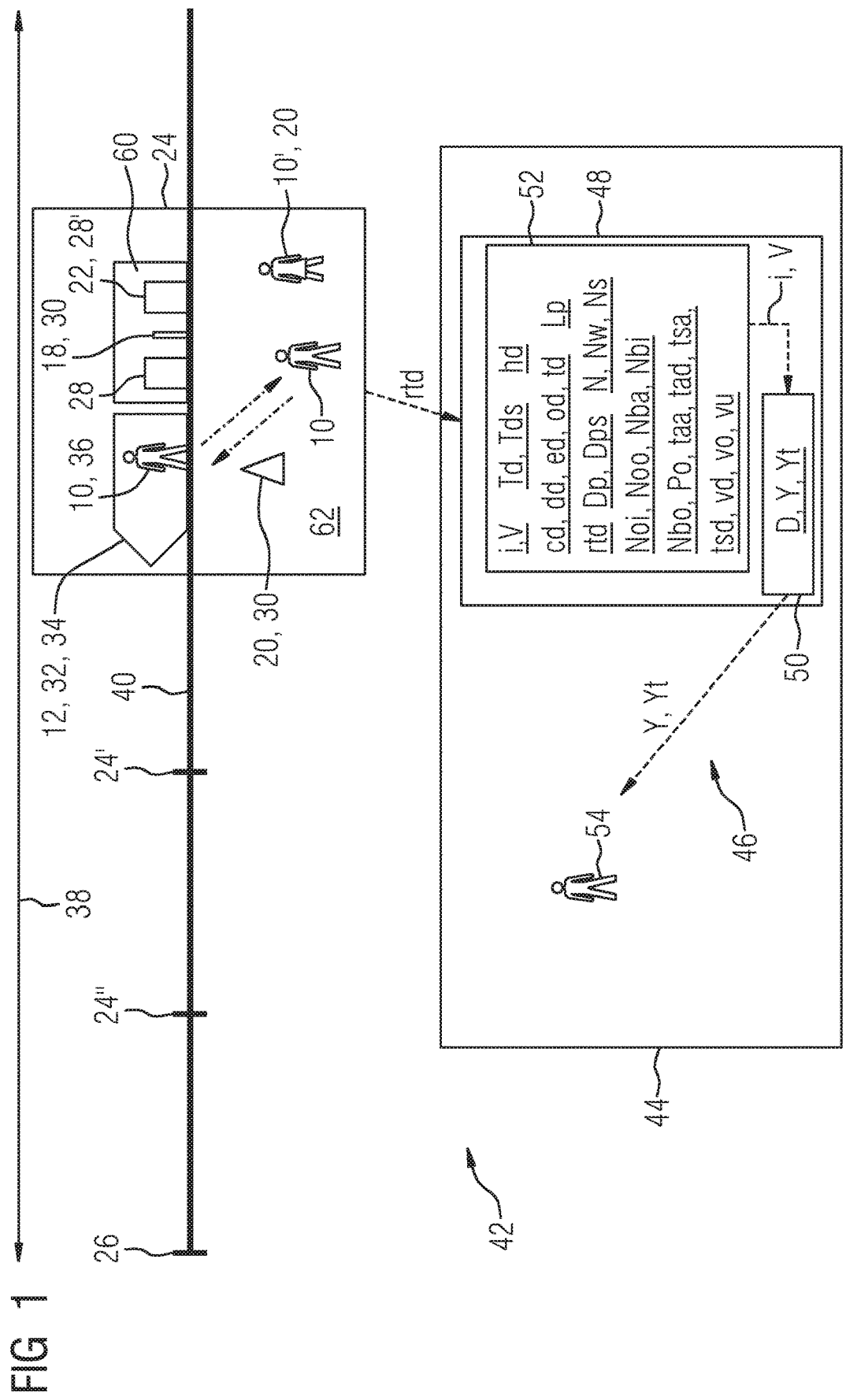
FIG. 1 is an illustration showing a track with several stations for a mobile unit used by an object as well as a determining system for determining a duration of an embarking and/or a disembarking process.

Referring now to the figures of the drawings in detail and first, particularly to FIG. 1 thereof, there is shown a pre-determined track 40 of a railway or subway system 42, like, for example, the German or Russian mainline railway or Munich subway. Moreover, FIG. 1 shows a mobile unit 12 like a track-bound vehicle 32, e.g. a train 34 in the form of a subway train 34, being moveable on the pre-determined track 40. In the following text the terms mobile unit 12, vehicle 32 and train 34 will be used synonymously. The mobile unit 12 is travelling over a travelling distance 38 along the track 40. Along the track 40 the mobile unit passes or arrives and departs, respectively, several stations 24, 24', 24", wherein one station 24 is exemplarily shown in more detail in FIG. 1. Moreover, a journey of the mobile unit 12 ends at a final station 26. Thus, the travelling distance 38 leads over several stations 24, 24', 24" to the final station 26. A beforehand or subsequent travel from/to a maintenance or parking area for the mobile unit 12 is not discussed in this specification.

At least one autonomously movable object 10, like a human 36 (passenger), an animal, a robot or a vehicle, is conveyable by the movable unit 12. For being conveyed or to travel with the train 34 the object 10 is embarking the mobile unit 12 at a station 24 and in case the object 10 was conveyed or travelled with the train 34 the object 10 is disembarking the mobile unit 12 at a station 24. Hence, the embarking process and/or the disembarking process occur at a (final) station 24, 24', 24", 26. For the embarking/disembarking the train 34 contains several doors 28, 28' of which two are exemplarily shown in FIG. 1.

Normally, several objects 10, 10', humans 36 or passengers are using the train 34 simultaneously. In this specification one object 10 alone will be examined or explained exemplarily as an active participant of an embarking process or a disembarking process. This is depicted with the reverse arrows in dashed lines connecting the object 10 outside the train 34 (at station 24) and the object 10 inside the train 34. Other present autonomously movable objects 10' will be viewed as passive elements and thus as an obstacle 18, 20 for the active object 10. However, since normally several objects 10, 10' or passengers embark/disembark a train 34 all objects 10, 10' are monitored individually and the obtained duration represents the duration D needed for all objects 10, 10'.

Other obstacles 18, 20, 22 may be also present—inside the train 34 (obstacles 18) as well as outside the train 34 (obstacles 20) or at the train 34 (obstacles 22). The obstacles 18, 20, 22 may, for example, be a stationary element 30, like a wall, a hand rail, a step, a railway seat, luggage, a trolley, a perambulator, a rubbish bin, maintenance area etc. Moreover, as stated above, the obstacle 18, 20 may also be another travelling (passive) object 10', like a not embarking passenger on a platform 62 at the station 24, 24', 24", 26 or a not disembarking passenger inside the train 34. An obstacle 22 at the mobile unit 12 may, for example, be a non-functioning, blocked or broken door 28' (see rectangle with dashed lines in left orientation (bottom to top) in FIG. 3).

The subway system 42 further has a control center 44 that contains a computer 46 equipped with an appropriate computer program that contains instructions which, when executed by the computer 46, cause the computer 46 to carry out the steps of a determining method. The proposed method provides a determining of a duration D of the embarking process and/or the disembarking process the autonomously movable object 10 (active passenger) conveyable by the movable unit 12 (details see below).

Moreover, the control center 42 contains as part of the computer 46 a determination system 48 for performing the method for determining of a duration D of the embarking process and/or the disembarking process. Therefore, the controlling system 42 contains at least one determining device 50 to perform determining steps of the determination method. The determining device 50 is a processing device. Moreover, it contains a storage device 52 for storage of parameters, like an input i, variables V or historic data hd. The parameters may be used for the determination of the duration D by the determining device 50 (for better representability only the delivery of input i and variable V is shown in FIG. 1). The control centre 44 may be supervised by an operator 54 which may also receive issued outputs, like a delay Y or a total delay Yt (details see below).

As stated above, the invention concerns a method for determining the duration D of the embarking process and/or the disembarking process of the autonomously movable object 10 conveyable by a movable unit 12. This is done by determining the duration D of the embarking process and/or the disembarking process of the autonomously movable object 10 embarking and/or disembarking the movable unit 12 by using a model describing an embarking process and/or the disembarking process of the autonomously movable object 10 embarking and/or disembarking a movable unit 12 spatially discreetly dynamically. Moreover, the embarking and/or disembarking model is a model selected out of the group consisting of: A cellular automaton model and a social force model. In other words, the model may be, for example, cellular automaton model or a social force model.

To determine the duration D at least one input i or input data is needed or is processed by the model. These input i can be stored in the storage device 52 of the control center 44. This may be a variable V selected out of the group consisting of: embarking data ed and/or disembarking data dd, configuration data cd, time data td and operational data od. Embarking data ed and/or disembarking data dd may be an input variable V selected out of the group consisting of: A number Noi, kind or dimension of an object 10, 10' inside the mobile unit 12, a number Noo, kind or dimension of an object 10, 10' outside the mobile unit 12, a number Nbi of (the) obstacle(s) 18 inside the mobile unit 12, a number Nbo of (the) obstacle(s) 20 outside the mobile unit 12, a number Nba, kind or dimension of (the) obstacle(s) 22 at the mobile unit 12, a position Po of the object 10.

Further, the configuration data cd may be an input variable V selected out of the group consisting of: A location Lb, dimension or kind of (the) obstacle(s) 18, 20, 22, a characteristic of the movable unit 12, a characteristic of a station 24, 24', 24", 26 of the movable unit 12. Moreover, the time data td may be an input variable V selected out of the group consisting of: A scheduled arrival time tsa of the mobile unit 12 at a station 24, 24', 24", 26, a scheduled departure time tsd of the mobile unit 12 at a station 24, 24', 24", 26, an actual arrival time taa of the mobile unit 12 at a station 24, 24', 24", 26, an actual departure time tad of the mobile unit 12 at a station 24, 24', 24", 26, a preferred duration Dp of the embarking process or the disembarking process. Furthermore, the operational data od may be an input variable V selected out of the group consisting of: A free-flow velocity vo of the object 10, a velocity vu of the movable unit 12, an opening velocity vd of a door 28, 28' of the movable unit 12.

Actually, an exact topology of the objects 10, 10', the obstacle(s) 18, 20, 22, the mobile unit 12 or part (like seats 68) thereof and/or of (an) element(s) or component(s) being involved in the embarking and/or disembarking process are taken into account by the model.

In other words, the input i may be:
a) By the train schedule it is provided how long a train 34 should stop at every station 24, 24', 24", 26, t_schedule (Dp), t_scheduled_arrival (tsa), t_real_arrival (taa), t_scheduled_departure_from station (tsd), t_real_departure_from_station (tad). This information should be provided for every station 24, 24', 24", 26 where it is planned that the train 34 should run. This information can be gained from schedule and/or a current situation.
b) Number (nba) and location (pb) of obstacles 22 at the train 34. For example, broken door(s) 28', which are blocked and cannot open. Also characteristics or parameters of the obstacle 22 or door 28', i.e. width of opening, may be considered.
c) Train inner configuration, i.e. topology of a train wagon 60, position/location Lb and size of chairs/seats 68 and other obstacles 20 if there are any, width of doors 28, 28', length and width of a wagon 60 etc. This information also usually available from train manufactures or train operation companies.
d) Number (Noi, Noo) of objects 10 (passengers) that embarking and disembarking the train 34 on the station 24, 24', 24", 26. This information may be historic hd or real time data rtd and can be taken from statistics or video recording or any other type of sensor that can provide information on current number (Noi, Noo, Nbi, Nbo) of passengers that embark and disembark a train 34.

Figure 2:
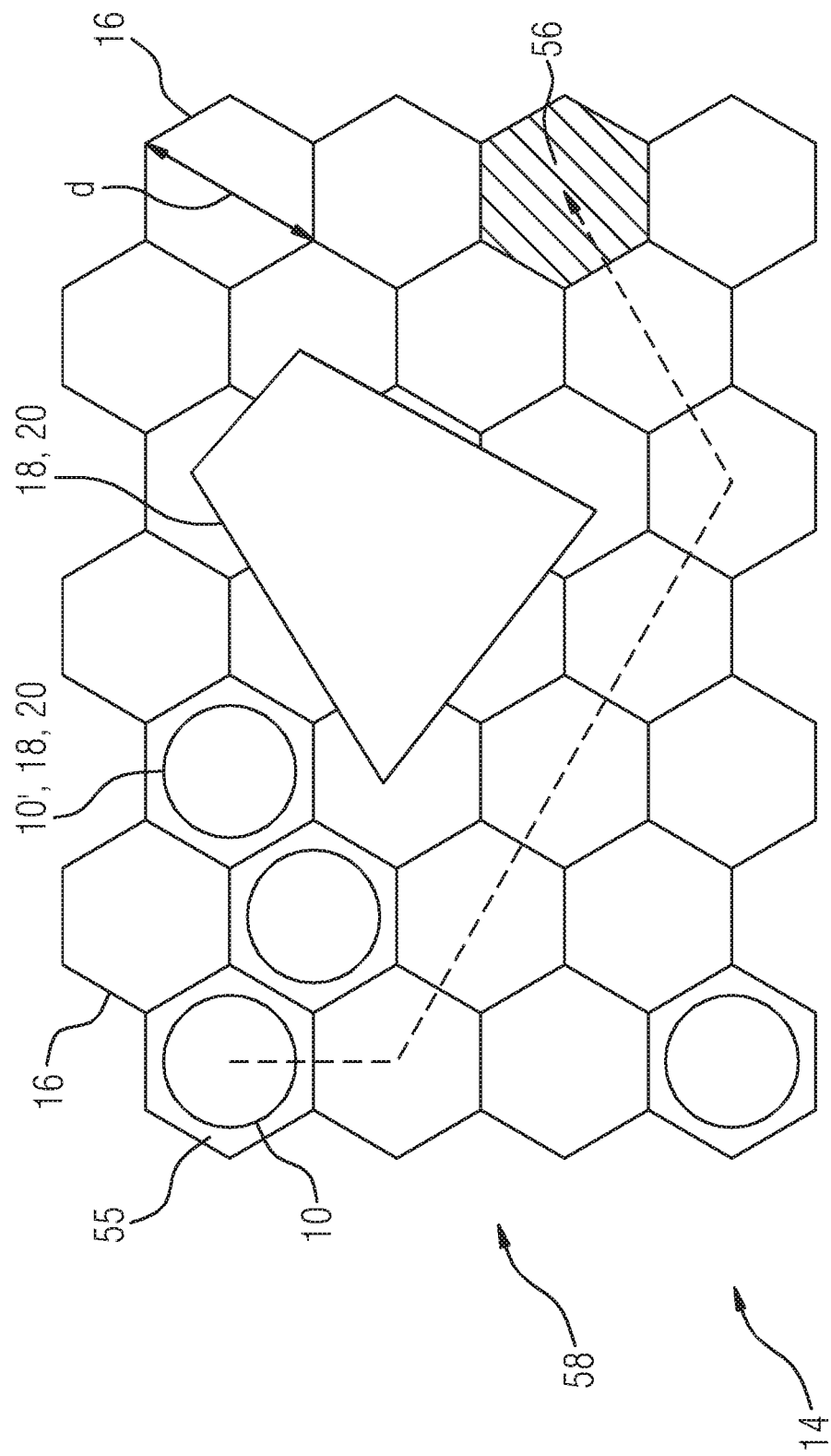
FIG. 2 is an illustration showing a movement of the object from FIG. 1 due to a cellular automaton model.

In the following passages the method will be exemplarily described in detail for the determination D of an embarking/disembarking of the object 10 at station 24 in reference to FIGS. 2 to 4. The term object may be substituted by the terms passenger or pedestrian.

On a first step it is needed to run the simulation for every station 24, 24', 24", 26 and estimate with a help of simulation how much time the object 10 or passengers will most likely need to embarking and disembarking the train 34.

Application of pedestrian stream simulation is necessary since only with a help of simulation all complex nonlinear effects can be taken into account such as nonlinear deceleration of pedestrians/passengers in case of increasing passenger density.

As stated above, the most appropriate models for simulation of embarking and disembarking the train 34 are whether cellular automaton or social force models since they can simulate disembarking and embarking a train 34 on a microscopic level which is the right scale of models for simulation of scenarios e.g. with broken doors 28'. Here cellular automation model is exemplarily considered. However, in a similar way social force model can be applied as well.

The description will be restricted to the minimum necessary to apply this model. For further reference please refer to: "Davidich M. Köster G (2013) Predicting Pedestrian Flow: A Methodology and a Proof of Concept Based on Real-Life Data. PLoS ONE 8(12): e83355"; referred to as "Davidich & Köster 2013" in the following text.

In the model it is assumed that the object 10 or the passengers "know" the shortest path (how to disembark and embark the train 34 through a door 28 (see rectangle with dashed lines in right orientation (bottom to top) in FIG. 3)). Limited vision of the object 10 is neglected as well as incomplete knowledge of the terrain. Pedestrians move from their current positions (source 55, which are, for example, the polygenic areas 66 for the embarking passengers (open circles) or the framed area 55 or the seats 68 inside the train 34 for the disembarking passengers (open squares) in FIG. 3) towards individual targets 56 (which is the area right outside of the doors 28 for an object 10 that disembark the train 34 and the area right after the doors 28 inside the train 34 for an object 10 that enters the train 34 (see FIGS. 2 and 3, area with dashed lines in right orientation (bottom to top) inside the train 34 in FIG. 3) for the embarking object 10 and elongated quadrangle with dashed contour line for the disembarking object 10) along shortest obstacle-free path, unless such a path is blocked by a "passive" object 10' or an obstacle 18, 20, respectively.

The active objects 10 as well as the passive objects 10' move at individual preferred speeds—the free-flow velocities (vo)—as long as the path is free. It is proposed to use values for free-flow velocity vo of the object 10 between 1 m/s and 1.5 m/s, preferably between 1.2 m/s and 1.4 m/s and most preferably of 1.34 m/s. Moreover, it is preferably normally distributed.

Apart from that each individual has a need for private space that depends on his/her current situation. This need is expressed in the distances that individuals try to keep from each other. It also makes people keep distances from obstacles 18, 20 such as walls. Pedestrians decelerate when the local density in their direction of movement is increased. This deceleration usually follows so-called Weidmann diagram which describes how people decelerate in case of increased pedestrian density. For further reference please refer to: "Davidich & Köster 2013".

The cellular automaton model uses a grid 14 with cells 16. In other words, in a cellular automaton model the area of observation 58 is divided into a lattice of cells 16 (see FIG. 2). It is proposed to use a hexagonal grid 14 for its two additional natural directions of movement compared to a square grid. A dimension of the cell 16 is dependent from an average value referring to a category of the object 10. Exemplarily, the cell diameter d is set to 53 cm to accommodate an average sized Caucasian male. This parameter can be adapted to better fit e.g. Asian pedestrians or children. Each cell 16 at each time step has one of the following states: either empty or occupied by either the object 10, an obstacle 18, 20 or a target 56.

Further, spatial dimensions and topology are considered. Pedestrians move on a single plane, i.e. two dimensions only. Sources 55 or the initial positions of the pedestrians and targets 56 have three types of parameters—their positions, schedules of pedestrian generation/disappearance and, for the sources 55, also source-target distributions that give probabilities for selecting pedestrian destinations when generating pedestrians.

Further, a model of "potential fields" is applied. Object 10 (pedestrians are) is treated as (a) negatively charged particle(s), say (an) electron(s). Object 10 (pedestrians are) is attracted by positive charges, such as exits, and repelled by negative charges such, as other pedestrians/object 10' or obstacles 18, 20. The forces between the object 10 (pedestrians), targets 56 and obstacles 18, 20 are expressed through suitable scalar functions, the potentials, which are summed up to form an overall potential field. For further reference please refer to: "Davidich & Köster 2013".

Obstacles 18, 20, like walls, are assigned positive potentials to make "people" prefer to keep a distance. The long-range attracting potential of a target 56 is coded in a floor field that corresponds to the arrival time of a wave front travelling with constant speed from the target 56 through the space formed by the obstacles 18, 20 and boundaries of the scenario. For further reference please refer to: "Hartmann D (2010) Adaptive pedestrian dynamics based on geodesics. New J Phys 12: 043032", referred to as "Hartmann D 2010" in the following text.

This ensures that each object 10, 10' moves along the shortest path to his or her target 56 as long as this path is free from other objects 10'. It is also possible to include clumps of pedestrians in the way to a target 56 in the computation of the floor field thus adding a further dynamic aspect to the potential. For further reference please refer to: "Hartmann D 2010".

When a virtual person steps ahead he or she selects the empty neighbor cell 16 with the steepest descent of the overall potential, thereby obstacles 18, 20 and other objects 10' are successfully skirted. The repulsive potential of a fellow pedestrian on the shortest path leads to either evasion or slowing down.

Simulation dynamics follows a specific kind of sequential update scheme. Each person has an individual speed, the free-flow velocity vo, which he/she tries to achieve—and indeed does achieve when the path is free. The value of the free-flow velocity vo prescribes how often the corresponding person will be chosen for an update: At each time step all persons (object 10, 10') are identified that are allowed to move. Faster persons are chosen more often so that on average each person moves with their prescribed speed as long as the path is free. The positions of the chosen pedestrians are updated in the order of their "life-time" in the simulation—that is, the time that has elapsed since their generation. For further reference please refer to: "Davidich & Köster 2013".

The general approach of the model as discussed above is now adapted to an embarking and/or disembarking scenario. Such a general setting scenario for a certain wagon 60 for a certain station 24 is shown in FIG. 3. The number Noi, Noo, Nbi, Nbo of passengers, being the active object 10 and all passive objects 10', entering the train 34 and disembarking the train 34 is calculated.

In particular, from the input i the number Nba and location Lb of the obstacle 22 or of a broken door 28', respectively, is known. For example as shown in FIG. 4, a number Nw of wagons 60, locations Lb of broken doors 28' or width of doors 28' is known. Moreover, it is known for each station 24, 24', 24", 26 on which side of a train 34 the doors 28, 28' should open. Exemplarily two broken doors 28' are shown in FIG. 4 that face a platform 62 of the station 24. Usually it is known from statistics how many objects 10, 10' or passengers embark and disembark a train 34 at each station 24, 24', 24", 26. This is exemplarily depicted in FIG. 4 by the number Noo_i to Noo_i to Noo_i+6 of objects 10, 10' at each wagon 60. Embarking and disembarking or passengers should be evenly distributed for every wagon 60 i.e. number Noo, Nbo of objects 10, 10' (obstacles 20) or passengers embarking the train 34 should be distributed to the wagons 60 (reference numerals are omitted in the formulas for better representability):

Number of passengers embarking a train/number of wagons=Number_of_passangers_that_aim_to_
enter_each_wagon)

and

Number_of_passengers_that_aim_to_enter_door_i_
of_each_wagon=Number_of_passangers_that_
aim_to_enter_each_wagon/number_of_door_in_
wagon_on_a_side_of_platform Sometimes distribution between the doors 28, 28' is uneven (for instance, higher proportion of people tries to enter head or end wagon 60). If this information is available, this uneven distribution can be taken into account, otherwise, if no additional information is available, even distribution as described above is assumed.

In a similar way the number Noi, Nbi of disembarking objects 10, 10' (obstacles 18) or passengers per wagon 60 is calculated:

Number_of_passengers_at_a_certain_station_that_
want_to_disembark_the_train/number_of_
wagons=Number_of_passengers_that want_
to_disembark_a_wagon_i and Number_of_passengers_that_aim_to_disem-
bark_througth_door_i_of_each_wagon=
Number_of_passangers_in_wagon_i/number_of_
working_doors_in_wagon_on_a_side_of_plat-
form Here, it is assumed that if the object 10 or the passengers is/are already inside the train 34 it/they know whether the door 28, 28' is working or not in comparison to the object 10 or passengers that is/are waiting on a platform 62 (they initially first assume that all doors 28, 28' are working).

There is also a number Nbi, Nbo of passive objects 10' or passengers (e.g. subjects 64) in a train 34 or on the platform 62 that don't disembark and embark the train 34, which should be also taken into account. Usually it is known how many objects 10, 10' or passengers travel from station A (24) to station B (24') or how occupied the train 34 at a certain time is. Based on this the number Nbi, Nbo of passengers (objects 10' or obstacles 18, 20) can be estimated and divide between wagons 60 similarly as described above.

Thus, for every door 28, 28' of every wagon 60 the number Noi, Noo, Nbi, Nbo of objects 10' or obstacles 18, 20 (passive objects 10') or of passengers that want to embark and disembark the wagon 60 is known. This is depicted in FIG. 3 for every door 28, 28' for the embarking objects 10, 10' by the open circles and for the disembarking objects 10, 10' by the open squares. The number of passengers (objects 10', subjects 64) that travel with a train 34 and don't disembark/embark the train 34 on a station 24 is also known. These are depicted as open triangles in FIG. 3.

The model also includes intermediate targets. Some objects 10, 10' or passengers want to enter the train 34 at a not working door 28' and are placed in front of it (at t=0). Since it can be assumed that they didn't know from the beginning that this door 28' does not work they first stay in front of the door 28' (see open circles in polygenic areas 66 on the right hand side of FIG. 3). First, each of these pedestrians receives as an intermediate target the nearest to him working door 28. As soon as he/she has reached this working door 28 he/she receives an end target 56 in accordance to the target 56 assigned to the corresponding door 28, for example, a seat 68 within the wagon 60. For further information please refer to: "Davidich M, Geiss F, Mayer H G, Pfaffinger A, Royer C (2013) Waiting zones for realistic modelling of pedestrian dynamics: A case study using two major german railway stations as examples. Transp Res Part C Emerg Technol Volume 37, December 2013, Pages 210-222"; referred to as "Davidich M et al. 2013" in the following text.

Further, the location of passengers at t=0 and their assignment to targets 56 is taken into account for the development of the scenario. For the train simulation the situation is the following:

At t=0 objects 10, 10' or passengers that want to enter the train 34 first group themselves aside of doors 28, 28' on a side where the doors 28, 28' are supposed to open (see polygenic areas 66). Usually people group in equal number on every side of a door 28, 28'. The embarking passengers (open circles) usually give the disembarking persons (open squares) time and space to get out of the train 34 first and only then start to move towards their target 56 (area with dashed lines in right orientation (bottom to top) inside the train 34), which is inside the wagon 60 they stay next to. However, different cultural behaviour if known could be taken here into account (for instance, not waiting when all people disembark the train 34).

In more detail, the entering object 10 or passengers get some cell 16 as a target 56 within the wagon 60 they want to enter. This cell 16 is random, however, it shouldn't be occupied by any other pedestrians or an obstacle 18, like a seat 68 (dash-dotted rectangles). The object 10 or passengers disembarking the train 34 start their movement first (by t=0). Their initial positions Po of the object 10 or the pedestrians is/are near the doors 28 as far as it could be reached in the presence of other obstacles 18 and passive obstacles 10' or other pedestrians that do not disembark the train 34.

In case of rush hours when density of passengers is high the passengers that do not disembark or embark the train 34, but just travelling inside the train 34 should be also taken into account because they can hinder or block embarking and disembarking of the object 10 or passengers especially by high densities. They can be taken into account as a "waiting zone" principle. For further information please refer to: "Davidich M. et al. 2013". By t=0 they should have a higher probability to receive seats 68 as a preferred target 56 and the rest of them should be evenly distributed within wagon 60.

The object 10 or the passengers that disembark the train 34 should be distributed in a way (by t=0) that they have a higher probability to be in the neighbourhood of a door 28 they want to get out of. The nearer the location to the door 28, the higher is the probability for the disembarking object 10 or passenger to be there.

Objects 10, 10' that are disembarking the train 34 are placed in the neighborhood of a door 28 (see framed area 55 in FIG. 3). Objects 10, 10' entering the train 34 are placed in front of doors 28, 28' (even of a door 28' is not working) (see polygenic areas 66). Passengers or subjects 64 that are travelling with a train 34 are marked with open triangle and mostly occupy seats 68.

The object 10 that disembarks the train 34 should get a target 56 outside of the wagon 60 on some distance from a door 28 he was disembarking from. Placing a target 56 in a distance will help to simulate the pedestrian behavior and take into account the deceleration of pedestrians by high densities, like to simulate the situation that an object 10, 10' or pedestrians that disembark the train 34 first can still decelerate the once that are behind them.

The time needed at every station had to be calculated. Time needed to embark and disembark the train 34 is the time moment when all objects 10, 10' or passengers that want to disembark the train 34 disembarked the train 34 from all wagons 60 and all objects 10, 10' or passengers that want to embark the train 34 have embarked the train 34. If the time is different for various wagons 60, the longest time (duration D) is taken and saved for every station 24, 24', 24", 26 (i) as t_simulation_station_i (duration D_i).

It is preferable to collect statistics. Hence, for estimation of time with help of this simulation ideally the same scenario should be run many time to collect some statistics and take the average time:

$$t\_simulation\_station\_i\_average.$$

The scenarios are constructed for each station 24, 24', 24", 26 where the train 34 is running and calculate t_simulation_station_i_average for every station 24, 24', 24", 26.

Now the model is used for delay estimation. Therefore, t_duration_at_every_station_according_to_schedule_at_station_i is calculated. Thus, the time (duration D) that is needed at every station i (24, 24', 24", 26) for exchange of the objects 10, 10' or passengers is calculated.

From schedule it can be calculated:

$$t\_duration\_at\_every\_station\_according\_to\_schedule\_at\_station\_i = t\_departure\_according\_to\_schedule\_at\_station\_i - t\_arrival\_according\_to\_schedule\_at\_station\_i.$$

This time:

$$t\_duration\_at\_every\_station\_according\_to\_schedule\_at\_station\_i \text{ should be compared with } t\_simulation\_station\_i\_average.$$

It is assumed that the train 34 cannot reduce travel time between stations 24, 24', 24", 26. This is true for commuter and tube trains 34 that have relative short distances between stations 24, 24', 24", 26 and for these train delays Y on stations 24, 24', 24", 26 due to a not working door 28' becomes critical.

Hence, the method can be used for determining a delay Y of the mobile unit 12 at a station 24, 24', 24", 26. The delay Y can be determined by: Comparing a determined duration D for the embarking and/or the disembarking process with a pre-set duration Dps for an embarking and/or disembarking process for example stored in the storage device 52 of the control center 44. If the determined duration D for an embarking and/or a disembarking process is longer than the pre-set duration Dps for an embarking and/or a disembarking process, then the difference between the determined duration D for an embarking and/or a disembarking process and the pre-set duration Dps for an embarking and/or a disembarking process is the delay Y of the mobile unit 12 at the station 24, 24', 24", 26.

The method can also be used for determining a total delay Yt of the mobile unit 12 over the travelling distance 38. The determination of the total delay Yt of the mobile unit 12 along the travelling distance 38 at the final station 26 is based on an accumulation of the delays Y at the respective several stations 24, 24', 24" and at the final station 26.

In detail:
At the beginning t_delay_sum_i=0,
For all i=1 . . . N (Ns=number of stations)
Then for all stations from station 1 to station Ns 1. If t_simulation_station_i_average>t_duration_at_every_station_according_to_schedule_at_station_i Then $$t\_simulation\_station\_i\_average - t\_duration\_at\_every\_station\_according\_to\_schedule\_at\_station\_i = t\_delay\_i \quad t\_delay\_sum\_i = t\_delay\_sum\_i-1 + t\_delay\_i$$

i.e. delays Y from various stations 24, 24', 24", 26 one by one are summarized.

2. If t_simulation_station_i_average=t_duration_at_every_station_according_to_schedule_at_station_i Then delay=0 (no delay at this station)

3. If t_simulation_station_i_average<t_duration_at_every_station_according_to_schedule_at_station_i Then if at previous stations 24, 24', 24" there were already delays Y (t_delay_sum_i−1>0), i.e. t_simulation_station_i_average>t_duration_at_every_station_according_to_schedule_at_station_i and t_departure_real>t_departure_schedule, than one can reduce the delay Y on this station $$t\_delay\_sum = t\_delay\_sum -$$

$$(t\_duration\_at\_every\_station\_according\_to\_schedule\_at\_station\_it\_simulation\_station\_i\_average)$$

where
t_departure_real is the real departure time (tad) which can be calculated as follows:

$$t\_departure\_real = t\_departure\_schedule + t\_delay\_sum\_i-1$$

else delay=0 t_delay_sum_i=t_delay_sum_i−1 does not change, for this station 24, 24', 24", 26 (since the train 34 cannot depart earlier than according to schedule).

Here, two points are taken into account. First, a train 34 cannot leave a station 24, 24', 24" earlier than it is in schedule.

Second, if there was already a delay Y beforehand so that the real departing time (tad) is later than the scheduled departure time (tsd), the train 34 can reduce the delay Y.

Thus, going through every station 24, 24', 24'', 26 delay_sum is iteratively calculated, i.e. the total delay Yt. In other words, all deltas for all stations 24, 24', 24'', 26 are summarized (and take into account whether it was possible to reduce delay Y or not).

This algorithm could be also modified for online estimation of total delay Yt based on current situation. For this ideally the current input i should be taken from video analysis or any other type of sensors that should provide information on how many objects 10, 10' or people want to enter the train 34. The estimation of disembarking the train 34 is the same as described above. In this case not only the scheduled time tsa, tsd of the train 34 (when the train 34 should arrive at the station 24, 24', 24'', 26 and leave) can be taken into account, but also the real arrival time taa, tad (instead of the scheduled time) and it can be taken into account that the train 34 is not allowed to depart earlier than the scheduled time tsd. Taking these changes into account one can easily simulate current delays Y at each station 24, 24', 24'', 26 and predict the total delay Yt of a train 34, since the run time of simulation for a type of scenario is usually less than a second on a common PC, therefore the prediction is possible.

Thus the method can be used for an online prognosis of the delay Y and/or the total delay Yt, wherein the determination of the delay Y and/or the total delay Yt is based on real time data rtd as an input i for the spatial discreet dynamical model. Furthermore, the method can be used for an offline simulation of the delay Y and/or the total delay Yt, wherein the determination of the delay Y and/or the total delay Yt is based on historic data hd as input i for the spatial discreet dynamical model.

Moreover, the invention describes a method for training the spatial discreet dynamical model. This method for training comprises the following steps: Providing of a training data set Tds that comprise a plurality of training data Td, wherein the training data comprises a duration D of an embarking process and/or a disembarking process of the autonomously movable object 10 embarking and/or disembarking the movable unit 12 and further the training data Td are selected out of the group consisting of: embarking data ed and/or disembarking data dd and/or configuration data cd, and/or time data td and/or operational data od. These data can be any input variable V disclosed above. Finally the training method contains the step of: Training the model by using the training data set Tds, wherein at least one parameter of the model is adapted.

Hence, the inventive method describes a way in which (a) delay(s) Y due to (a) broken door(s) 28' can be calculated ahead. In particular, it discloses a simulation of disembarking and embarking scenario and an application of an algorithm gained from the simulation.

In summary, the invention proposes, exemplarily summarized for operation of a train 34 with a broken door 28':
1. The idea of the application of a pedestrian stream simulation to a calculation of a delay Y of a train 34 due to a broken door 28'.
2. Particular description how pedestrian stream simulation should be applied, including:
   a. Which types of spatial discreet dynamical models to use.
   b. How to modify known statistics of passenger flows into the simulation scenario.
   c. How to construct a particular scenario for a certain station 24, 24', 24'', 26 or stop, which reflects the real situation of passenger exchange, including parameters, phenomena and all initial conditions for simulation that should be taken into account.
3. How to estimate the average time for passenger exchange (for embarking and disembarking a train 34) with a help of the simulation.
4. Algorithm how to calculate the total delay Yt of a train 34 with a broken door 28' for off-line and on-line scenarios.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the invention is illustrated and described in detail by the preferred embodiments, the invention is not limited by the examples disclosed, and other variations can be derived therefrom by a person skilled in the art without departing from the scope of the invention.

The following is a summary list of reference numerals and the corresponding structure used in the above description of the invention:

10 object
12 unit
14 grid
16 cell
18 obstacle
20 obstacle
22 obstacle
24 station
26 station
28 door
30 element
32 vehicle
34 train
36 human
38 distance
40 track
42 subway system
44 control centre
46 computer
48 determination system
50 determining device
52 storage device
54 operator
55 source
56 target
58 area of observation
60 wagon
62 platform
64 subject
66 area
68 seat
cd configuration data
dd disembarking data
D duration
Dp preferred duration
Dps pre-set duration
d diameter
ed embarking data
hd historic data
i input
Lb location obstacle
Noi number object inside
Noo number object outside
Nba number obstacle at
Nbi number obstacle inside Nbo number obstacle outside
Ns number of stations
Nw number of wagons
od operational data
Po position object
rtd real time data
taa actual arrival time
tad actual departure time
td time data
Td training data
Tds training data set
tsa scheduled arrival time
tsd scheduled departure time
V variable
vd velocity door
vo velocity object
vu velocity mobile unit
Y delay
Yt total delay

The invention claimed is:

1. A method for determining a duration of an embarking process and/or a disembarking process of at least one autonomously movable object conveyable by a movable unit, which comprises the step of:
   determining the duration of the embarking process and/or the disembarking process of the at least one autonomously movable object embarking and/or disembarking the movable unit by using a model describing the embarking process and/or the disembarking process of the at least one autonomously movable object embarking and/or disembarking the movable unit spatially discreetly dynamically, wherein the model processes at least one input;
   selecting the at least one input from a variable selected from the group consisting of embarking and/or disembarking data, configuration data, time data and operational data;
   selecting the embarking and/or disembarking data from the group consisting of a number, kind or dimension of the autonomously movable object inside the movable unit, a number, kind or dimension of the autonomously movable object outside the movable unit, a number of an obstacle inside the movable unit, a number of an obstacle outside the mobile unit, a number, kind or dimension of an obstacle at the movable unit, and a position of the autonomously movable object;
   selecting the configuration data from the group consisting of a location, dimension or kind of an obstacle, a characteristic of the movable unit, and a characteristic of a station of the movable unit;
   selecting the time data from the group consisting of a scheduled arrival time of the movable unit at the station, a scheduled departure time of the movable unit at the station, an actual arrival time of the movable unit at the station, an actual departure time of the movable unit at the station, and a preferred duration of the embarking process or the disembarking process;
   selecting the operational data from the group consisting of a free-flow velocity of the autonomously movable object, a velocity of the movable unit, and an opening velocity of a door of the movable unit;
   selecting the obstacle from the group consisting of a stationary element or a broken door of the movable unit;
   wherein the model comprises determining whether the door of the train is functioning or a broken door of the train from a sensor output and the broken door does not open to allow passengers to enter the broken door of the train, and wherein the model further comprises providing for a time delay based on the passengers movement avoiding the broken door and the passengers movement boarding the train based on the movement of the passengers to the functioning door of the train, and applying the time delay of the boarding due to the broken door to a travel time of the train between a plurality of stations.

2. The method according to claim 1, which further comprises selecting the model from the group consisting of a cellular automaton model and a social force model.

3. The method according to claim 2, wherein the cellular automaton model uses a grid having at least one cell, the at least one cell having a dimension being dependent on an average value referring to a category of the at least one autonomously movable object.

4. The method according to claim 2, wherein the cellular automaton model uses a hexagonal grid having at least one cell with a cell diameter of 53 cm and/or the cellular automaton model uses a two dimensional plane.

5. The method according to claim 1, wherein the free-flow velocity of the at least one autonomously movable object is between 1 m/s and 1.5 m/s.

6. The method according to claim 1, wherein the obstacle includes another autonomously movable object.

7. The method according to claim 1, wherein the movable unit is a track-bound vehicle.

8. The method according to claim 1, wherein the at least one autonomously movable object is selected from the group consisting of a human, an animal, a robot and a vehicle.

9. The method according to claim 1, wherein the free-flow velocity of the at least one autonomously movable object is between 1.2 m/s and 1.4 m/s.

10. The method according to claim 1, wherein the free-flow velocity of the at least one autonomously movable object is 1.34 m/s.

11. A method for determining a delay of a mobile unit at a station for the mobile unit, wherein an embarking process and/or a disembarking process occurs at the station and the delay is determined by the following steps of:
    determining a duration of the embarking process and/or the disembarking process of at least one autonomously movable object conveyable by the mobile unit by using a model describing the embarking process and/or the disembarking process of the at least one autonomously movable object embarking and/or disembarking the mobile unit spatially, discreetly and dynamically, wherein the model processes at least one input;
    comparing a determined duration for the embarking process and/or the disembarking process with a pre-set duration for the embarking process and/or the disembarking process and if the determined duration for the embarking process and/or the disembarking process is longer than the pre-set duration for the embarking process and/or the disembarking process, then a difference between the determined duration for the embarking process and/or the disembarking process and the pre-set duration for the embarking process and/or the disembarking process is the delay of the mobile unit at the station;
    selecting the at least one input from a variable selected from the group consisting of embarking and/or disembarking data, configuration data, time data and operational data;

selecting the embarking and/or disembarking data from the group consisting of a number, kind or dimension of the autonomously movable object inside the movable unit, a number, kind or dimension of the autonomously movable object outside the movable unit, a number of an obstacle inside the movable unit, a number of an obstacle outside the mobile unit, a number, kind or dimension of an obstacle at the movable unit, and a position of the autonomously movable object;

selecting the configuration data from the group consisting of a location, dimension or kind of an obstacle, a characteristic of the movable unit, and a characteristic of a station of the movable unit;

selecting the time data from the group consisting of a scheduled arrival time of the movable unit at the station, a scheduled departure time of the movable unit at the station, an actual arrival time of the movable unit at the station, an actual departure time of the movable unit at the station, and a preferred duration of the embarking process or the disembarking process;

selecting the operational data from the group consisting of a free-flow velocity of the autonomously movable object, a velocity of the movable unit, and an opening velocity of a door of the movable unit;

selecting the obstacle from the group consisting of a stationary element or a broken door of the movable unit;

wherein the model comprises determining whether the door of the train is functioning or a broken door of the train from a sensor output and the broken door does not open to allow passengers to enter the broken door of the train, and wherein the model further comprises providing for a time delay based on the passengers movement avoiding the broken door and the passengers movement boarding the train based on the movement of the passengers to the functioning door of the train, and applying the time delay of the boarding due to the broken door to a travel time of the train between a plurality of stations.

12. The method according to claim 11, which further comprises determining a total delay of the mobile unit over a travelling distance of the mobile unit, wherein the travelling distance leads over several stations to a final station of the mobile unit and wherein a determination of the total delay of the mobile unit along the travelling distance at the final station is based on an accumulation of the delays at respective several stations and at the final station.

13. The method according to claim 12, which further comprises determining an online prognosis of the delay and/or the total delay, wherein the determination of the delay and/or the total delay is based on real time data as an input for the model being a spatial discreet dynamic model.

14. The method according to claim 12, which further comprises performing an offline simulation of the delay and/or the total delay, wherein the determination of the delay and/or the total delay is based on historic data as input for the model being a spatial discreet dynamic model.

15. A method for training a spatial discreet dynamic model, which comprises at least the following steps of:

providing a training data set that contains a plurality of training data, the training data containing a duration of an embarking process and/or a disembarking process of at least one autonomously movable object embarking and/or disembarking a mobile unit and the training data being selected from the group consisting of:
embarking and/or disembarking data;
configuration data;
time data; and
operational data;

selecting the embarking and/or disembarking data from the group consisting of a number, kind or dimension of the autonomously movable object inside the mobile unit, a number, kind or dimension of the autonomously movable object outside the mobile unit, a number of an obstacle inside the mobile unit, a number of an obstacle outside the mobile unit, a number, kind or dimension of an obstacle at the mobile unit, and a position of the autonomously movable object;

selecting the configuration data from the group consisting of a location, dimension or kind of an obstacle, a characteristic of the mobile unit, and a characteristic of a station of the mobile unit;

selecting the time data from the group consisting of a scheduled arrival time of the mobile unit at the station, a scheduled departure time of the mobile unit at the station, an actual arrival time of the mobile unit at the station, an actual departure time of the mobile unit at the station, and a preferred duration of the embarking process or the disembarking process;

selecting the operational data from the group consisting of a free-flow velocity of the autonomously movable object, a velocity of the mobile unit, and an opening velocity of a door of the mobile unit;

selecting the obstacle from the group consisting of a stationary element or a broken door of the movable unit; and training the spatial discreet dynamic model by using the training data set, wherein at least one parameter of the spatial discreet dynamic model is adapted;

wherein the spatial discreet dynamic model comprises determining whether the door of the train is functioning or a broken door of the train from a sensor output and the broken door does not open to allow passengers to enter the broken door of the train, and wherein the spatial discreet dynamic model further comprises providing for a time delay based on the passengers movement avoiding the broken door and the passengers movement boarding the train based on the movement of the passengers to the functioning door of the train, and applying the time delay of the boarding due to the broken door to a travel time of the train between a plurality of stations.

* * * * *